(12) United States Patent
Elam

(10) Patent No.: US 11,892,544 B2
(45) Date of Patent: Feb. 6, 2024

(54) GNSS DATA INTEGRITY MONITORING AS A CONNECTED SERVICE

(71) Applicant: Honeywell International Inc., Morris Plains, NJ (US)

(72) Inventor: Jeffrey Robert Elam, Dunedin, FL (US)

(73) Assignee: Honeywell International Inc., Charlotte, NC (US)

( * ) Notice: Subject to any disclaimer, the term of this patent is extended or adjusted under 35 U.S.C. 154(b) by 158 days.

(21) Appl. No.: 16/865,032

(22) Filed: May 1, 2020

(65) Prior Publication Data

US 2021/0341626 A1 Nov. 4, 2021

(51) Int. Cl.
| | |
|---|---|
| *G01S 19/20* | (2010.01) |
| *G01S 19/21* | (2010.01) |
| *G01S 19/47* | (2010.01) |
| *G01S 19/49* | (2010.01) |
| *G01S 19/03* | (2010.01) |
| *G01S 19/07* | (2010.01) |

(52) U.S. Cl.
CPC .............. *G01S 19/20* (2013.01); *G01S 19/21* (2013.01); *G01S 19/215* (2013.01); *G01S 19/47* (2013.01); *G01S 19/03* (2013.01); *G01S 19/07* (2013.01); *G01S 19/49* (2013.01)

(58) Field of Classification Search
CPC ........ G01S 19/20; G01S 19/21; G01S 19/215; G01S 19/47; G01S 19/49; G01S 19/03; G01S 19/07
USPC ... 342/357.3, 357.32, 357.58, 357.59, 357.4, 342/357.44
See application file for complete search history.

(56) References Cited

U.S. PATENT DOCUMENTS

| | | |
|---|---|---|
| 6,760,663 B2 | 7/2004 | Brenner |
| 7,266,445 B1 | 9/2007 | Janky et al. |
| | (Continued) | |

FOREIGN PATENT DOCUMENTS

| | | |
|---|---|---|
| CN | 108088470 A | 5/2018 |
| EP | 1212634 B1 | 3/2008 |
| | (Continued) | |

OTHER PUBLICATIONS

European Patent Office, "Extended European Search Report from EP Application No. 21168999.7", from Foreign Counterpart to U.S. Appl. No. 16/865,032, dated Oct. 1, 2021, pp. 1 through 12, Published: EP.

(Continued)

*Primary Examiner* — Chuong P Nguyen
(74) *Attorney, Agent, or Firm* — Fogg & Powers LLC

(57) ABSTRACT

Techniques for incorporating blended Global Navigation Satellite System (GNSS) and Inertial Navigation System (INS) integrity monitoring information as a connected network database are described. Information relating to the integrity of known instances of GNSS disturbances can be stored and accessed by users. The information can include data regarding the integrity of GNSS/INS position solutions generated from vehicles a priori, such as the location, time, and any known causes of the GNSS disturbance. The database can be located on a vehicle and/or on a remote server that can be shared to other users with access to the database. In some embodiments, access can be restricted to certain users if the data stored is confidential.

20 Claims, 5 Drawing Sheets

(56) References Cited

U.S. PATENT DOCUMENTS

| | | | |
|---|---|---|---|
| 8,976,064 B2 | 3/2015 | Brenner | |
| 9,058,703 B2 | 6/2015 | Ricci | |
| 9,596,570 B1 * | 3/2017 | Cardoso de Moura | ...................... H04L 67/1004 |
| 9,769,614 B2 * | 9/2017 | Cardoso de Moura | ...................... H04L 67/52 |
| 9,820,100 B1 * | 11/2017 | Jarvis | ................... G01C 21/206 |
| 9,860,702 B1 * | 1/2018 | Cardoso de Moura | ...................... H04L 67/52 |
| 9,961,501 B1 * | 5/2018 | Cardoso de Moura | ...................... H04W 4/80 |
| 10,551,504 B2 * | 2/2020 | Peake | ..................... G01S 19/09 |
| 10,935,663 B2 * | 3/2021 | Biacs | ..................... G01S 19/20 |
| 11,442,174 B2 * | 9/2022 | Cao | .......................... G01S 19/40 |
| 2013/0194132 A1 * | 8/2013 | Kim | ........................ G01S 19/20 342/357.64 |
| 2017/0070971 A1 * | 3/2017 | Wietfeldt | .............. G01S 19/074 |
| 2019/0028904 A1 * | 1/2019 | Carpenter | ............ G08G 5/0069 |
| 2019/0094371 A1 * | 3/2019 | Biacs | ....................... G01S 19/08 |
| 2020/0233092 A1 * | 7/2020 | Peake | ................... G01S 19/072 |
| 2020/0334345 A1 * | 10/2020 | Young | ..................... G06F 21/32 |
| 2021/0157011 A1 * | 5/2021 | Biacs | ....................... G01S 19/20 |
| 2021/0341626 A1 * | 11/2021 | Elam | ...................... G01S 19/21 |

FOREIGN PATENT DOCUMENTS

| | | | | |
|---|---|---|---|---|
| JP | 2016118493 A | * | 6/2016 | ............. G01S 19/22 |
| KR | 20200663283 A | * | 6/2020 | ........... G05D 1/0278 |

OTHER PUBLICATIONS

European Patent Office, "Extended European Search Report from EP Application No. 21168999.7", from Foreign Counterpart to U.S. Appl. No. 16/865,032, dated Nov. 24, 2021, pp. 1 through 12, Published: EP.

* cited by examiner

GNSS DATA INTEGRITY MONITORING AS A CONNECTED SERVICE

BACKGROUND

Modern land, air, or water vehicles, in both the commercial and military domains depend on navigation systems to guide their travels. Commercial aircraft, for example, rely on system navigation to safely travel through terrain or weather changes, whereas military aircraft rely on system navigation for effective reconnaissance, precise airstrikes, or defensive maneuvering. Such vehicle navigation systems usually include a Global Navigation Satellite System (hereinafter "GNSS"), such as a Global Positioning System (hereinafter "GPS") and may also include an Inertial Navigation System (hereinafter "INS"). Vehicles utilizing modern system navigation heavily rely on GNSS technology. Yet despite the ubiquitous reliance on GNSS technology, current systems struggle to respond when such technology is compromised.

GNSS data may be susceptible to multiple forms of manipulation and misdirection, both intentional and unintentional, which may leave systems utilizing this data unable to navigate. GNSS jamming occurs when navigation signals are blocked or interfered by an outside entity, thus preventing any and all use of GNSS navigation systems. In contrast, GNSS spoofing occurs when navigation signals are altered or modified to deceptively reflect false position information to a vehicle. Current systems utilizing GNSS technology must have adequate safeguards for identifying or correcting manipulated GNSS navigation data or risk compromising mission objectives. Maintaining confidence in the integrity of GNSS data is thus an important factor in extensive GNSS systems reliance.

While different countermeasures for detecting and correcting GNSS disturbances exist, these countermeasures may not be sufficient to protect vehicles that rely on GNSS technology if such countermeasures fail. Ineffective or failed countermeasures can result in the vehicle becoming vulnerable to jammed or spoofed GNSS signals, which can be catastrophic for the vehicle and the crew onboard.

SUMMARY

In one embodiment, a system is described. The system comprises a plurality of vehicles, and a navigation system onboard each vehicle of the plurality of vehicles. The navigation system comprises both a Global Navigation Satellite System (GNSS) receiver and an Inertial Navigation System (INS). The system also comprises a processor coupled to the navigation system. The processor is configured to: receive measurements corresponding to navigation integrity data from the navigation system, analyze the received measurements, identify one or more navigation parameters of at least one GNSS disturbance based on the analysis of the received measurements, generate data based on the one or more navigation parameters, store the generated data, and disseminate the generated data between one or more vehicles of the plurality of vehicles.

In another embodiment, a program product is described. The product comprises non-transitory computer-readable medium having computer-executable instructions stored thereon. When executed by one or more processors, the instructions cause the one or more processors to perform the following tasks: receive measurements corresponding to navigation integrity data from a plurality of navigation systems, wherein each of the plurality of navigation systems comprises a Global Navigation Satellite System (GNSS) receiver and an Inertial Navigation System (INS) located on one of a plurality of vehicles; analyze the received measurements; identify one or more navigation parameters of at least one GNSS disturbance based on the analysis of the received measurements; generate data based on the one or more navigation parameters; store the generated data; and disseminate the generated data between one or more vehicles of the plurality of vehicles.

In another embodiment, a method is described. The method comprises receiving a request for information about known GNSS disturbances. The method further comprises accessing a database, wherein the database comprises generated data, the generated data generated by: receiving measurements corresponding to navigation integrity data from a navigation system, wherein the navigation system comprises a Global Navigation Satellite System (GNSS) receiver and an Inertial Navigation System (INS) located on a plurality of vehicles, analyzing the received measurements, identifying one or more navigation parameters of at least one GNSS disturbance based on the analysis of the received measurements, wherein the generated data is based on the one or more navigation parameters, wherein the generated data is stored in the database, and providing the generated data in response to the request.

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
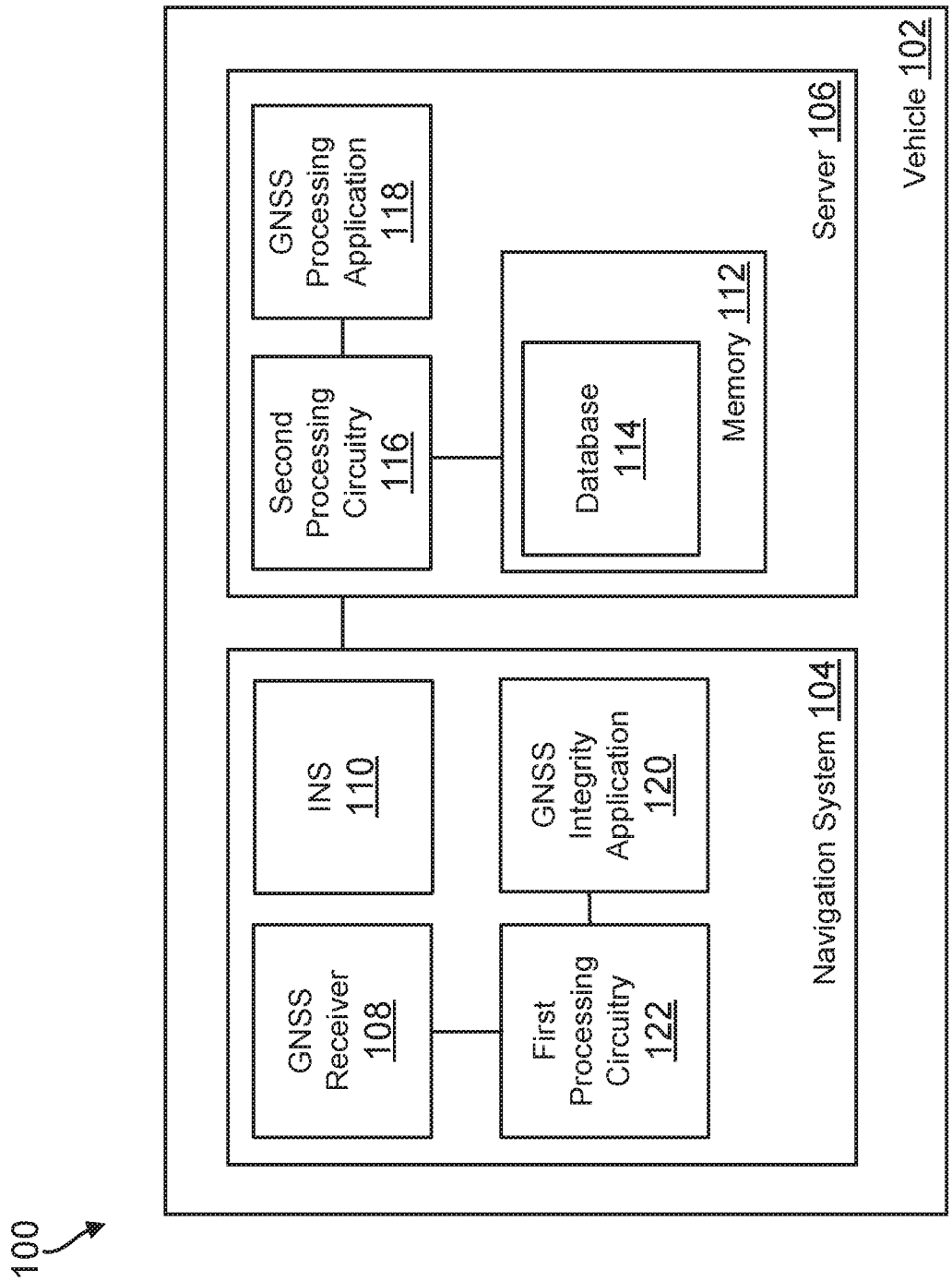
FIG. 1 depicts a block diagram of a system including a server for processing data to identify GNSS disturbances, storing data for the identified disturbances, and disseminating the data to one or more vehicles, as illustrated in one embodiment of the present disclosure.

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The following disclosure is directed to improvements in GNSS data integrity monitoring. Specifically, embodiments of the present disclosure relate to a shared data server that processes acquired data to identify, store, and disseminate GNSS disturbances, for example data corresponding to GPS jamming and spoofing, to other vehicles as part of a connected network. The processing techniques described herein can analyze, identify, and correlate instances of known, repeated GNSS disturbances including data regarding time and location of occurrence, occurrence frequency, or known or believed cause of occurrence from raw navigation data. Furthermore, the data server may be embodied both onboard a vehicle or may provide data to one or more vehicles from a remote location. By utilizing the disclosed embodiments, a vehicle operator can download relevant navigation data before a mission, or can update navigation data to the shared data server in real-time during a mission as GNSS disturbances become known.

Throughout this disclosure, terms are intended to convey their ordinary meaning as understood by one having skilled in the art unless otherwise indicated. For example, use of the term "vehicle" is intended to include all classes of vehicles that fall within the ordinary meaning of the term, and would include air vehicles, space vehicles, water vehicles, land vehicles, and motor vehicles. Although an aircraft is illustrated throughout this disclosure, this illustration is merely for pedagogical purposes only and not by way of limitation. In addition, "GNSS disturbance" as used herein means any intentional or unintentional modification of GNSS signals before acquisition by a GNSS receiver or analogous signal retrieval device. Common examples include GNSS jamming and GNSS spoofing. And the term "exemplary" is not necessarily meant to connote preferred or desirable embodiments but those in which further illustrate the principles, applications, or nuances of the present disclosure.

One embodiment of the present disclosure is further illustrated in FIG. 1, which describes a system 100 including a server 106 onboard one or more vehicles 102 with second processing circuitry 116 configured to execute the instructions of GNSS processing application 118 for receiving, analyzing, and disseminating shared GNSS integrity information across a network. Though only a single vehicle is shown in FIG. 1, the same principles described herein with respect to FIG. 1 apply also to multiple vehicles in a network, where each vehicle of a plurality of vehicles includes a server 106 for implementing the system in FIG. 1. "Network" as used herein means a collection of vehicles (which may include different air, water, etc.), ground control stations, and/or vehicle communication stations that are communicatively coupled via one or more communication links. The server 106 is coupled to a navigation system 104, which may optionally include first processing circuitry 122 configured to execute the instructions of GNSS integrity application 120 for determining the integrity of raw GNSS data.

Referring to FIG. 1, a vehicle 102 (such as an aircraft, land, or water vehicle) includes navigation system 104 and server 106. Navigation system 104 further includes GNSS receiver 108, which receives GNSS signal navigation data measurements corresponding to a position of the vehicle 102, such as altitude, attitude, heading, or three-dimensional position coordinates in a reference coordinate system (e.g. Cartesian coordinates). These signals can originate from global-based GNSS systems (such as GPS, GLONASS, Galileo, or BeiDou), or can originate from regional-based GNSS systems (such as QZSS or NAVIC). Additionally, navigation system 104 includes INS 110, which may be composed of a combination of gyroscopes, accelerometers, magnetometers, and related circuitry. INS 110, which may include one or more inertial measurement units (e.g. sensors), is configured to determine navigation data measurements, including altitude, attitude, and/or heading of vehicle 102. INS 110 can be further configured to provide the navigation data measurements to first processing circuitry 122, where the navigation data can be used to generate a navigation solution (including e.g. position, velocity, attitude) of vehicle 102.

In an embodiment, navigation system 104 may optionally include processing circuitry coupled to GNSS receiver 108 (illustrated as first processor circuitry 122 in FIG. 1) configured to execute the instructions of GNSS integrity application 120. First processing circuitry 122 receives the GNSS signal navigation data measurements from GNSS receiver 108 and performs an integrity check on the measurements to ensure that the received measurements are accurate, precise, and free of any tampering of the measurements, for example deceptive tampering via GNSS jamming or spoofing. Although FIG. 1 illustrates an integrity check performed by first processor circuitry 122 via GNSS integrity application 120, the integrity check may be performed outside of navigation system 104. For example, in another embodiment, the integrity check is performed from server 106 via second processor circuitry 116. Thus, although FIG. 1 illustrates a separate processor configured to perform integrity checking on received navigation data measurements, the integrity and data processing functions (described below) can be implemented in the same processor. Regardless of whether an integrity check is performed on the GNSS navigation data measurements, these measurements are sent to server 106 for further processing.

Server 106 is coupled to navigation system 104 and includes second processing circuitry 116, memory 112, and GNSS processing application 118. Second processing circuitry 116 may include any one or combination of processors, microprocessors, digital signal processors, application specific integrated circuits, field programmable gate arrays, or other similar variants thereof. Each processor circuit may include or function with software programs, firmware, or other computer readable instructions for carrying out various process tasks, calculations, and control functions, used in the methods described herein. These instructions can be tangibly embodied on any storage media (or computer readable media) used for storage of computer readable instructions or data structures. Memory 112 and its components described herein can be implemented with any available storage media (or computer readable medium) that can be accessed by a general purpose or special purpose computer or processor, or any programmable logic device. Suitable computer readable media may include storage or memory media such as semiconductors, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media. In addition, memory 112 may include database 114 for storing data executed by GNSS processing application 118. GNSS processing application 118 and its equivalents in other illustrations can be implemented as computer readable media including storing instructions to be executed by one or more processors.

Server 106 enables vehicle 102 to send, receive, and store GNSS disturbance data from or to other sources in a network, such as other vehicles (not shown) or ground communications systems (also not shown) via processing of received GNSS data integrity measurements. For example, server 106 can receive navigation data measurements or integrity data measurements from another vehicle or ground control station. Such data can be obtained as it is being processed or retrieved after processing is complete. In practice the embodiments disclosed herein allow for data retrieval in real-time (such as updates to known GNSS disturbances through a flight path as the vehicle is traveling) or pre/post-flight (such as by downloading GNSS disturbance data to a relevant flight path before a flight). Specifically, the storing, processing, and disseminating features can be implemented via algorithmic means, such as GNSS processing application 118 shown in FIG. 1.

Server 106 receives the raw GNSS navigation data measurements and optionally the navigation data measurements from INS 110 from navigation system 104 or from one or more navigation systems onboard a separate vehicle (not shown), where it can analyze the received data to identify patterns and determine correlations to other known GNSS disturbance events based on the acquired navigation data. Second processing circuitry 116 is configured to execute the instructions of GNSS processing application 118. When executed, second processing circuitry 116 is configured to receive navigation data measurements or integrity data measurements. Server 106 can also connect to a network that is shared across multiple vehicles. For example, in one embodiment, the network includes a plurality of vehicles and second processing circuitry 116 is configured to receive navigation data measurements or integrity data measurements from other vehicles in the network via each vehicle's respective navigation system. "Navigation data measurements" as used herein means position, velocity, attitude, time measurements calculated as part of a blended solution that uses information from both the GNSS receiver and inertial-based system. "Integrity data measurements" as used herein means a measure of the trustworthiness of the navigation data measurements. Integrity data measurements include, but are not limited to, failure detection flags or protection and uncertainty levels.

If an integrity check has not yet been performed on the received navigation data measurements, second processing circuitry 116 can be configured to perform an integrity check on the measurements. For example, second processing circuitry 116 can use the data acquired by GNSS receiver 108 and compare it to the data acquired by INS 110. Additionally, or alternatively, the measurements may be compared using other reliable integrity techniques including comparison via other sensors onboard the vehicle (e.g. radar altimetry techniques), receiver autonomous integrity monitoring ("RAIM"), or other integrity techniques.

Second processing circuitry 116 is then configured to analyze the received integrity data measurements for indications of common or repeated GNSS disturbances based on data processing techniques. For example, second processing circuitry 116 (e.g. via GNSS processing application 118) can analyze or process integrity data measurements by comparing the output received by navigation system 104 (e.g. as performed by GNSS integrity application 120) to defined thresholds to determine whether the integrity data measurements indicate a likelihood that the integrity data measurements are reflective of a GNSS disturbance event. Also, such thresholds can be used to determine whether the integrity data measurements indicate a significant common pattern of GNSS disturbances based on other received integrity data measurements.

Once it analyzes the integrity data measurements, second processing circuitry 116 is configured to identify one or more navigation parameters corresponding to one or more GNSS disturbances based on the analysis. "Navigation parameter" as used herein means a set or class of data included in the navigation data or integrity data measurements about a variable used in vehicle navigation. Navigation parameters can include variables such as vehicle position (e.g. latitude, longitude, altitude), vehicle speed, time (e.g. duration of disturbance or time of occurrence) and frequency of occurrence, or other variables that can be used to classify the integrity data measurements. For example, when GNSS processing application 118 analyzes GNSS disturbance(s) from the received navigation data measurements, second processing circuitry 116 can be further configured to capture relevant data corresponding to the analyzed GNSS disturbance data, such as position(s) and time(s) where the disturbances occurred.

Once navigation parameters of a GNSS disturbance have been identified, second processing circuitry 116 is further configured to generate data based on the identified navigation parameters. The type of generated data depends on the embodiment. For example, in one embodiment the generated data may include a compilation of known GNSS disturbances in a geographical area, where the compilation includes data detailing the identified navigation parameters received by server 106. Additionally, or alternatively, the generated data can include a map of the processed integrity data measurements received by server 106, where the map includes data about the navigation parameters identified from the data analysis. The map can be updated or modified as server 106 receives and processes additional integrity data measurements. In yet another embodiment the generated data includes data corresponding to GNSS satellite exclusion occurrences, GNSS signal strength fluctuations, and/or differences in navigation subsystem measurements (such as differences between GNSS and INS measurements).

Next, second processing circuitry 116 is configured to store the generated data. Data may be stored via external means, such as an external hard drive or computer-readable media. Data may also be stored internally. For example, second processing circuitry 116 may be coupled to memory 112, which may store data generated by second processing circuitry 116 on server 106. Furthermore, memory 112 may include one or more databases 114 for storing data, such as generated maps. Data can be retrieved by vehicle 102 to use or update as needed.

In yet another embodiment, second processing circuitry 116 is further configured to disseminate the generated data to one or more vehicles. Dissemination can occur in real-time (as the data is being processed or generated) or post-processing (retrieving data from memory storage). Dissemination can also occur automatically to every local vehicle or ground station in a network or via specific request. Dissemination of GNSS disturbance data allows for a comprehensive information network where pilots and flight crew can access essential navigation information before a flight. This in turn allows for ex ante discovery of potential GNSS disturbances based on already existing data so that a vehicle and its flight crew can be prepared for known obstacles to GNSS use during a voyage and can adjust its precautionary procedures accordingly with reduced surprise and improved voyage predictability.

However, since dissemination in some embodiments may be disclosed solely by request, certain instances exist where dissemination would be undesired. Exemplary situations arise in certain military applications, where unrestricted dissemination would compromise classified mission data. Therefore, in some embodiments, dissemination can be limited to certain data types, such as restricting access to generated data based on identified navigation parameters (e.g. location, frequency, or known cause of GNSS disturbance), or can be limited to specific authorized users by request. Furthermore, in one embodiment, server 106 can implement a user authentication protocol using known data encryption techniques to prevent the unauthorized dissemination or access to stored data.

Figure 2:
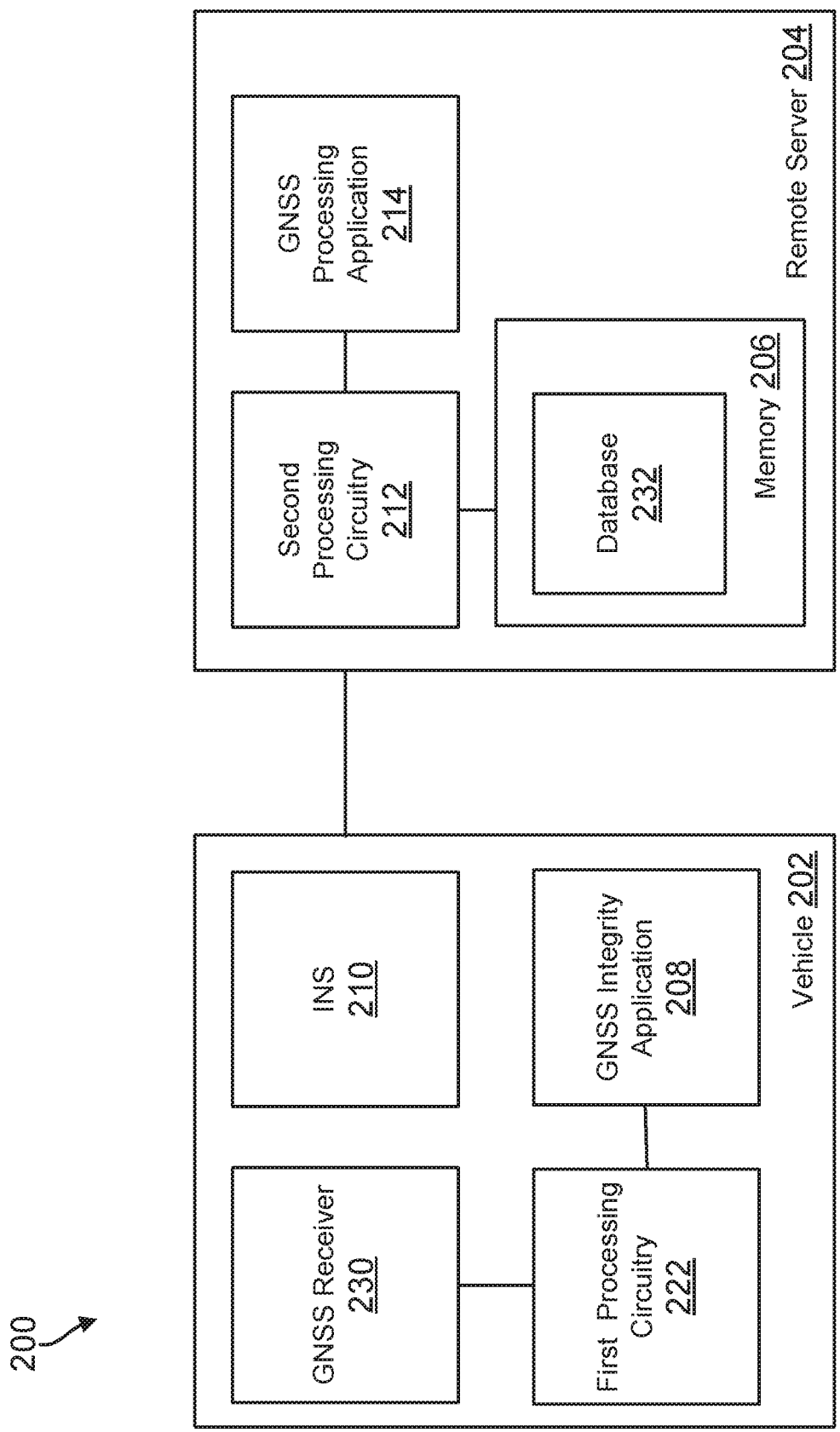
FIG. 2 depicts a block diagram of a system for processing data to identify GNSS disturbances, storing data for the identified disturbances, and disseminating the data from a remote server, as illustrated in one embodiment of the present disclosure.

Referring now to FIG. 2, a further embodiment of the present disclosure implementing a system configured to process, store, and disseminate GNSS disturbance data is described. System 200 includes one or more vehicles 202, wherein each vehicle includes a GNSS receiver 230 and INS 210. In contrast to FIG. 1, server 204 is not located onboard vehicle 202, but rather is communicatively coupled to vehicle 202 at a remote location (for example, at a ground control station). Like FIG. 1, server 204 includes second processing circuitry 212 coupled to memory 206, wherein second processing circuitry 212 is configured to execute the instructions embodied in GNSS processing application 214 described with respect to FIG. 1. Likewise, vehicle 202 may optionally include first processing circuitry 222 configured to execute the instructions of GNSS integrity application 208, in which an integrity checking algorithm is performed on received navigation data measurements as described above. However, such integrity checking may also be performed by second processing circuitry 212.

Similar to FIG. 1, second processing circuitry 212 is configured to receive integrity data measurements sent from vehicle 202. In other embodiments, when sufficient bandwidth is available, navigation data measurements can be received by second processing circuitry 212, where second processing circuitry can be configured to assess the integrity of the received navigation data measurements (e.g. determine the integrity data measurements). Second processing circuitry 212 is also configured to analyze the received integrity data measurements, identify navigation parameter(s) from the analyzed data, and generate data based on the identified navigation parameters in the processed integrity data measurements using the same techniques as described above. Second processing circuitry 212 is then configured to store the generated data in remote server 204 via memory 206, which may also include database 232. Additionally, or alternatively, remote server 204 can disseminate the generated data to other vehicles in the same fashion as described above with respect to FIG. 1. Dissemination can be communicated via communication techniques such as high frequency (HF), very high frequency (VHF), ultra high frequency (UHF), satellite communication (SATCOM), and other communication techniques.

Figure 3:
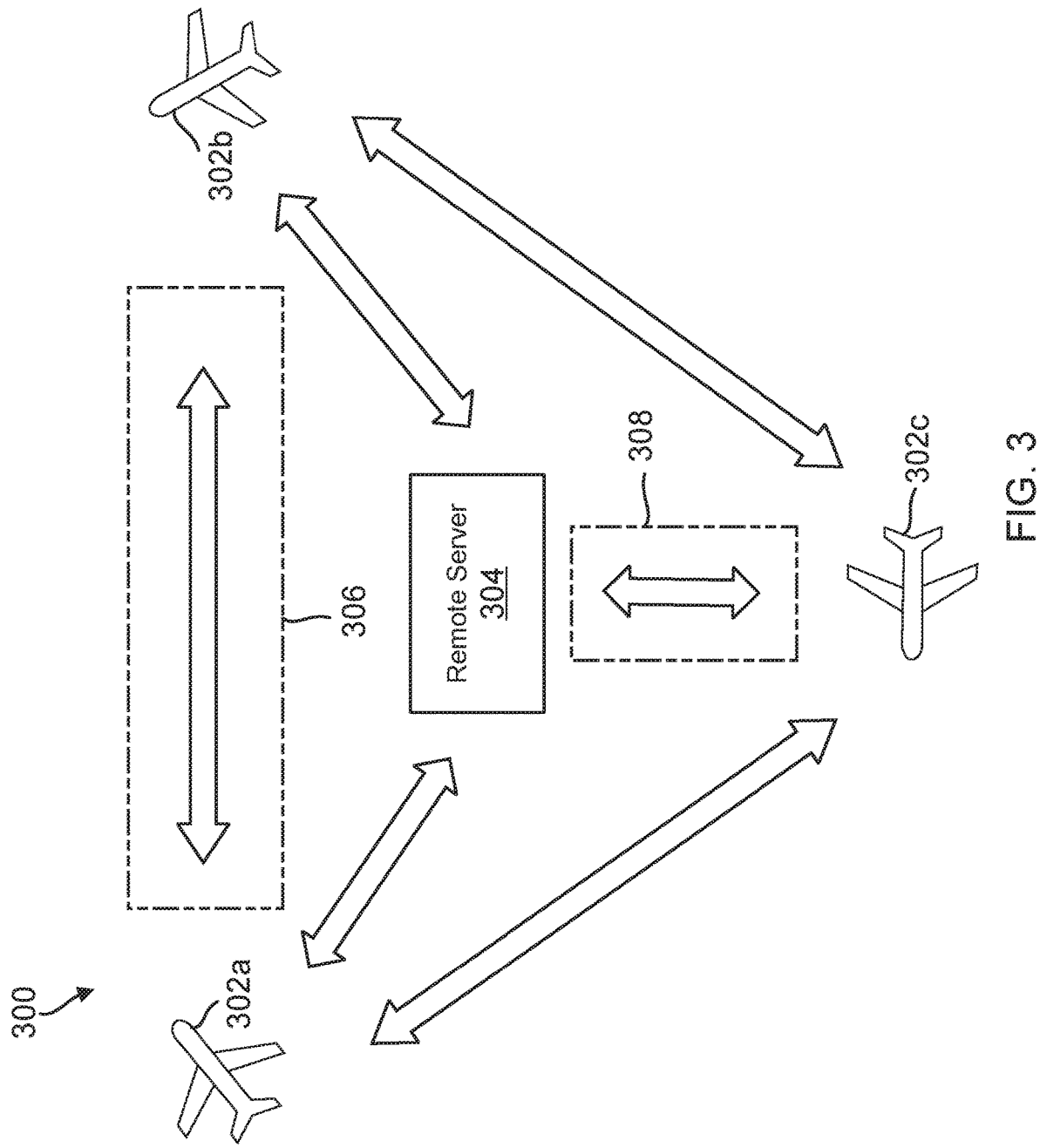
FIG. 3 depicts a diagram of a network wherein GNSS disturbance data is shared among vehicles, as illustrated in one embodiment of the present disclosure.

FIG. 3 is a diagram of a network which further illustrates the embodiments described above. Diagram 300 includes vehicles 302a, 302b, and 302c in a network, along with a remote server 304. Block 306 illustrates the embodiments described with respect to FIG. 1: namely, that vehicles 302a, 302b, and 302c can be equipped with servers configured to receive, process, store, and disseminate compiled navigation data to other vehicles in the network. This dissemination may be accomplished independently from remote server 304. Additionally, block 308 illustrates the embodiments described with respect to FIG. 2, wherein acquired navigation data and/or integrity data measurements from vehicles 302a, 302b, and 302c are sent to remote server 304. Remote server 304 can then optionally perform an integrity check if no such integrity check was performed by the respective vehicle, and then performs the processing, storage, and dissemination functions on the received integrity data measurements. The processed data can be stored on a shared database in remote server 304, which can be accessed by any vehicle in the network, or may be available upon request. Notably, however, the embodiments described in FIGS. 1 and 2 need not be mutually exclusive of one another as illustrated in FIG. 3; in some instances, it may be preferable to have open dissemination between vehicles 302a, 302b, and 302c in addition to remote server 304 (for example, if remote server 304 acts as a central network hub that simultaneously receives generated navigation data measurements as they are communicated through other vehicles).

Figure 4:
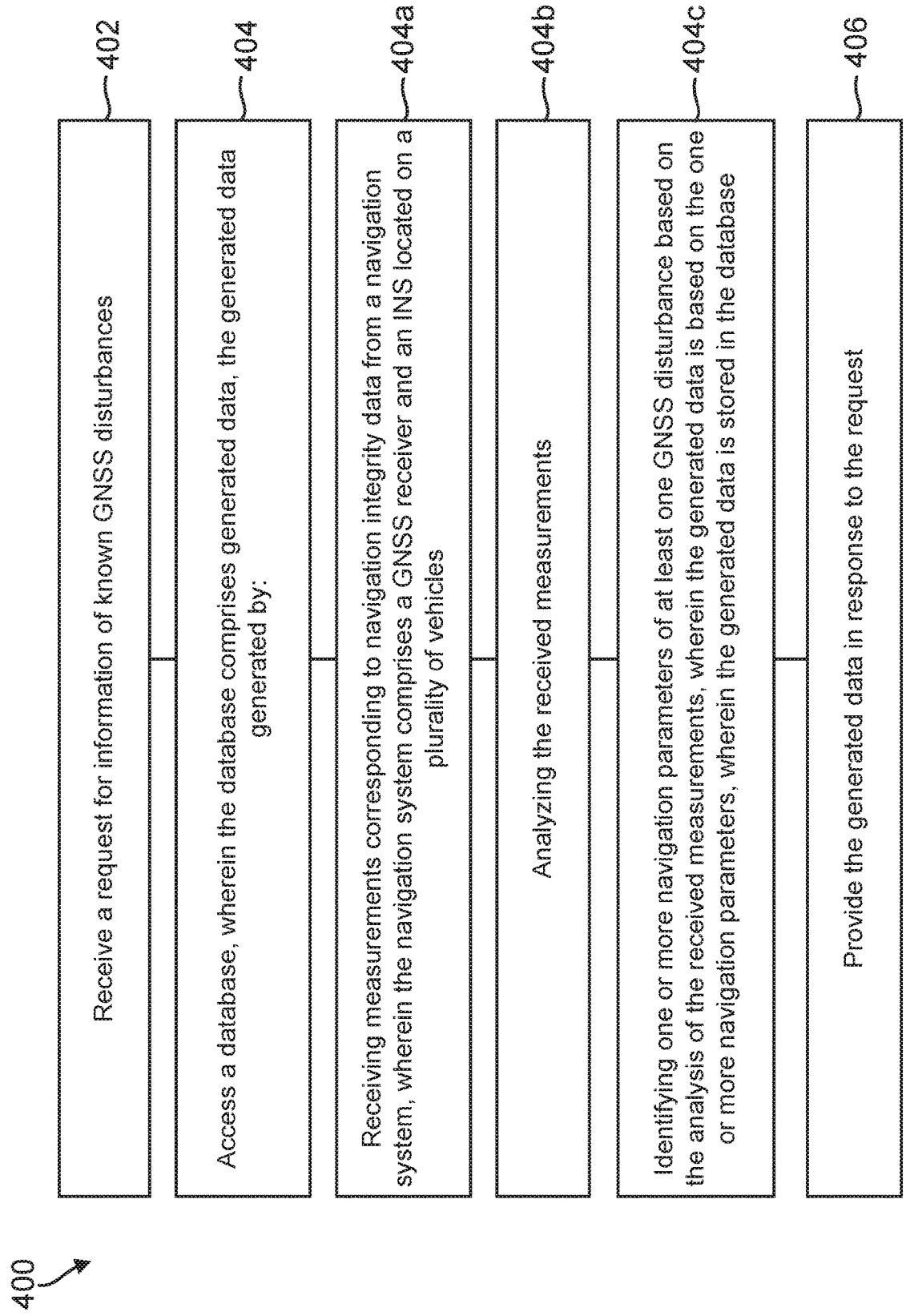
FIG. 4 depicts a process for generating a database based on receiving GNSS disturbance data from one or more vehicles, as illustrated in one embodiment of the present disclosure.

Next, FIG. 4 illustrates a method for processing, storing, and disseminating GNSS navigation data to other vehicles in a network. Method 400 may be performed, for example, using the systems described in FIGS. 1-3, but is not limited to those embodiments. Method 400 begins at step 402, receiving a request for information of known GNSS disturbances. The request may be sent by one or more vehicles. In certain instances, for example, if the information is restricted or classified to the user initiating a request, the request may be denied.

Assuming a valid request, method 400 proceeds to step 404, accessing a database, wherein the database comprises generated data of known GNSS disturbances. The database may be located onboard one or each of the vehicles in a multi-vehicle network, or may be located on a remote server. Method 400 then includes sub-steps 404a, 404b, and 404c describing how the data in the database is generated. At step 404a, measurements corresponding to navigation integrity data are received from a navigation system, wherein the navigation system comprises a GNSS receiver and an INS. Navigation data can include both GNSS-based data in addition to inertial navigation data measurements. Then, at step 404b, the received integrity data measurements are analyzed for common or repeated GNSS disturbances using processing techniques described above. Next, at step 404c, one or more navigation parameters of at least one GNSS disturbance are identified based on the analysis of the received measurements. The generated data is based on the one or more navigation parameters and is stored in the database, where it is retrieved by a server located directly or remotely with respect to the requesting vehicle.

In one embodiment, the generated data may include a compilation of known GNSS disturbances in a geographical area, where the compilation includes data detailing the identified navigation parameters. Additionally, or alternatively, the generated data can include a map of the received navigation data, where the map includes the navigation parameters identified from the data analysis. The map can be updated as additional navigation data is updated. In yet another embodiment the generated data includes data corresponding to GNSS satellite exclusion occurrences, GNSS signal strength fluctuations, and/or differences in navigation subsystem measurements (such as differences between GNSS and INS measurements).

Method 400 ends at step 406, providing the generated data in response to the request. The data can be provided in real-time (as the data is being processed or generated) or post-processing (retrieving data from memory storage). In some embodiments, dissemination can be limited to certain data types, such as restricting access to generated data based on identified navigation parameters (e.g. location, frequency, or known cause of GNSS disturbance), or can be limited to specific authorized users by request. For example, in one embodiment, the server provides the generated data only to the entity (e.g. vehicle or vehicle crew) that requested the generated data in response to an authorized request. That is, neither other vehicles in the network, nor the managing entity of the server itself can access the data stored in the database. Such a situation may arise, for example, in certain military applications where the data stored in the database is highly confidential and the server is managed by a non-military entity. In that case, the server can provide access to the database to an authorized user without access to the contents of the data while maintaining confidentiality with respect to other users in the network, including the managing entity of the server. These embodiments are graphically illustrated in FIG. 5.

Figure 5:
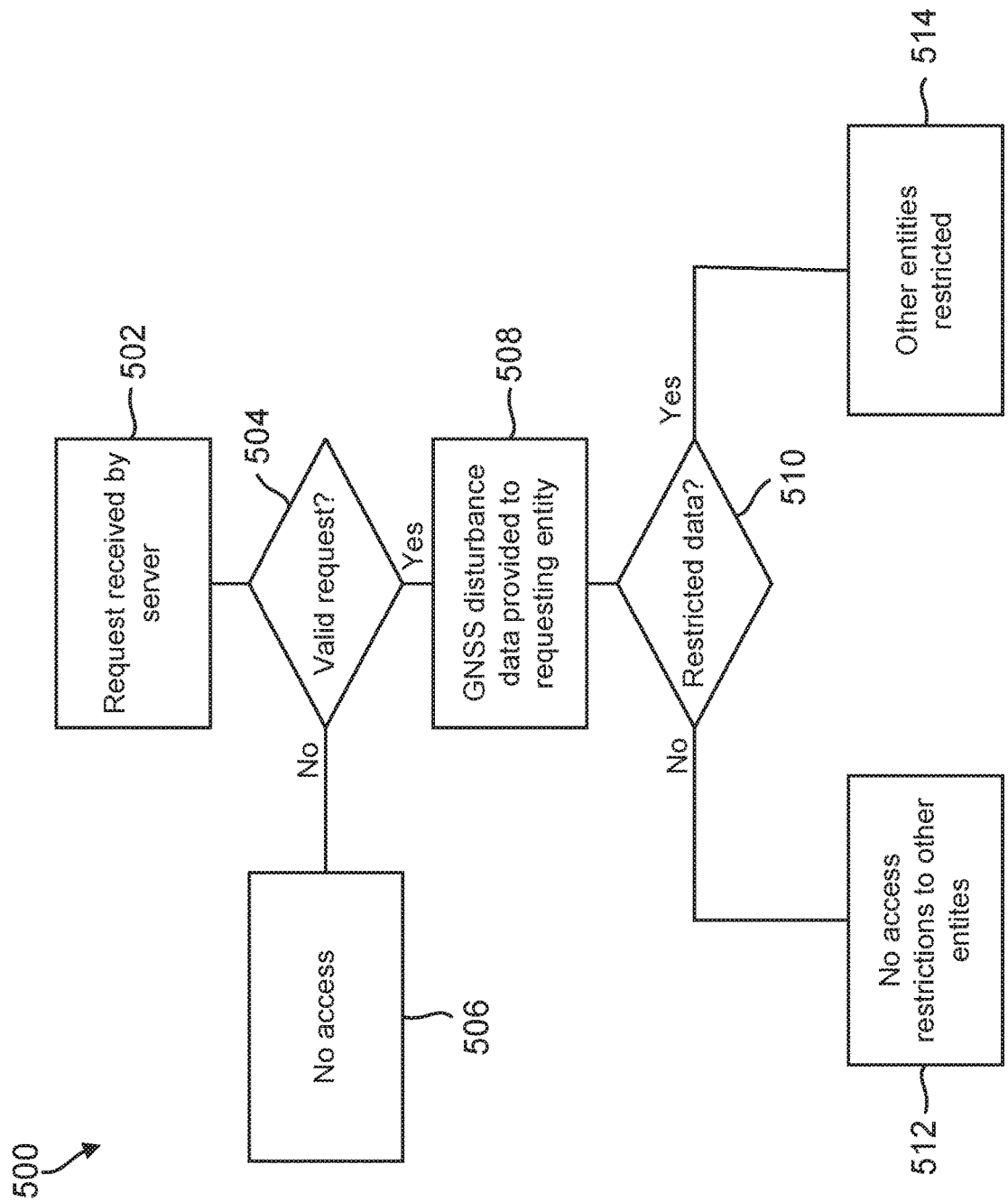
FIG. 5 depicts a flow chart illustrating how access to a database can be restricted based on a received request or GNSS disturbance data stored in the database.

FIG. 5 illustrates depicts a flow chart 500 illustrating how access to a database can be restricted based on a received request or the type of GNSS disturbance data stored in the database. Flow chart 500 can be implemented in conjunction with the techniques described above with respect to storing processed GNSS integrity data measurements in a database included on a server. The flow chart 500 begins at block 502, where the server receives a request by an entity (e.g. vehicle) to access the GNSS disturbance data stored by the database. Following the request, flow chart 500 proceeds to decision block 504 which evaluates the authenticity of the request. If the request is unauthorized, then flow chart 500 proceeds to block 506, where access to the database (and hence the GNSS disturbance data) is denied. If the request is authorized, flow chart 500 proceeds to block 508 where GNSS disturbance data is provided to the requesting entity.

Flow chart 500 then proceeds to decision block 510 which evaluates the level of access to other users in the network. If the GNSS disturbance data is unrestricted, then flow chart 500 proceeds to block 512, where other entities in the network can also access the GNSS disturbance data provided to the requester. However, if the GNSS disturbance data is restricted, then flow chart 500 proceeds to block 514, where other entities in the network may not be able to access the GNSS disturbance data provided to the requester. Restrictions on access can be enabled in a variety of ways. For example, access restrictions can be imposed to other entities based on the navigation parameter(s) (e.g. location of GNSS disturbance) of generated data in the database. Access restrictions may also be imposed based on the entities in the network. In one embodiment, access to the requested GNSS disturbance data is only provided to the authorized entity requesting the data. Other entities in the network, including the managing entity, are unable to access the contents of the data, although the server is still configured to provide access to the contents to the authorized requester.

EXAMPLE EMBODIMENTS

Example 1 includes a system, comprising: a plurality of vehicles; a navigation system onboard each vehicle of the plurality of vehicles, wherein the navigation system comprises a Global Navigation Satellite System (GNSS) receiver and an Inertial Navigation System (INS); and a processor coupled to the navigation system, wherein the processor is configured to: receive measurements corresponding to navigation integrity data from the navigation system, analyze the received measurements, identify one or more navigation parameters of at least one GNSS disturbance based on the analysis of the received measurements, generate data based on the one or more navigation parameters, store the generated data, and disseminate the generated data between one or more vehicles of the plurality of vehicles.

Example 2 includes the system of Example 1, wherein the processor is further configured to restrict access to the generated data in response to an unauthorized request.

Example 3 includes the system of any of Examples 1-2, wherein to disseminate the generated data further comprises disseminating the generated data via a remote server.

Example 4 includes the system of any of Examples 1-3, wherein to generate data corresponding to the at least one GNSS disturbance further comprises generating a map based on the generated data.

Example 5 includes the system of any of Examples 1-4, wherein the one or more navigation parameters comprises at least one of position data and temporal data.

Example 6 includes the system of any of Examples 1-5, wherein the generated data comprises at least one of: GNSS satellite exclusion occurrences; GNSS signal strength fluctuations; and differences in navigation subsystem measurements.

Example 7 includes the system of any of Examples 1-6, wherein to generate data corresponding to the at least one GNSS disturbance further comprises further comprises compiling the analyzed measurements.

Example 8 includes the system of any of Examples 1-7, further comprising a second processor coupled to the vehicle, wherein the second processor is configured to determine the integrity of the received measurements.

Example 9 includes a non-transitory computer-readable medium having computer-executable instructions stored thereon which, when executed by one or more processors, cause the one or more processors to: receive measurements corresponding to navigation integrity data from a plurality of navigation systems, wherein each of the plurality of navigation systems comprises a Global Navigation Satellite System (GNSS) receiver and an Inertial Navigation System (INS) located on one of a plurality of vehicles; analyze the received measurements; identify one or more navigation parameters of at least one GNSS disturbance based on the analysis of the received measurements; generate data based on the one or more navigation parameters; store the generated data; and disseminate the generated data between one or more vehicles of the plurality of vehicles.

Example 10 includes the non-transitory computer-readable medium of Example 9, wherein the computer-executable instructions further cause the one or more processors to restrict access to the generated data in response to an unauthorized request.

Example 11 includes the non-transitory computer-readable medium of any of Examples 9-10, wherein to disseminate the generated data further comprises disseminating the generated data via a remote server.

Example 12 includes the non-transitory computer-readable medium of any of Examples 9-11, wherein to generate data based on the at least one GNSS disturbance further comprises generating a map based on the generated data.

Example 13 includes the non-transitory computer-readable medium of any of Examples 9-12, wherein the generated data comprises at least one of position data and temporal data.

Example 14 includes the non-transitory computer-readable medium of any of Examples 9-13, wherein the generated data comprises at least one of: GNSS satellite exclusion occurrences; GNSS signal strength fluctuations; and differences in navigation subsystem measurements.

Example 15 includes a method, comprising: receiving a request for information about known GNSS disturbances; accessing a database, wherein the database comprises generated data, the generated data generated by: receiving measurements corresponding to navigation integrity data from a navigation system, wherein the navigation system comprises a Global Navigation Satellite System (GNSS) receiver and an Inertial Navigation System (INS) located on a plurality of vehicles, analyzing the received measurements, identifying one or more navigation parameters of at least one GNSS disturbance based on the analysis of the received measurements, wherein the generated data is based on the one or more navigation parameters, wherein the generated data is stored in the database, and providing the generated data in response to the request.

Example 16 includes the method of Example 15, wherein providing the generated data further comprises restricting access to the generated data only to the entity that requested the generated data.

Example 17 includes the method of any of Examples 15-16, wherein providing the generated data further comprises providing the generated data via a remote server.

Example 18 includes the method of any of Examples 15-17, wherein generating data based on the at least one GNSS disturbance comprises generating a map based on the generated data.

Example 19 includes the method of any of Examples 15-18, wherein the navigation parameter comprises at least one of position data and temporal data.

Example 20 includes the method of any of Examples 15-19, wherein the generated data comprises at least one of: GNSS satellite exclusion occurrences; GNSS signal strength fluctuations; and differences in navigation subsystem measurements.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

What is claimed is:

1. A system, comprising:
   a plurality of vehicles;
   a navigation system onboard at least one vehicle of the plurality of vehicles, wherein the navigation system comprises a Global Navigation Satellite System (GNSS) receiver and an Inertial Navigation System (INS); and
   at least one processor coupled to the navigation system, wherein the at least one processor is configured to:
   receive navigation data measurements or navigation integrity data measurements from the navigation system,
   analyze the received measurements,
      identify one or more navigation parameters of at least one GNSS disturbance based on the analysis of the received measurements, generate data based on the one or more navigation parameters, store the generated data, and
      disseminate the generated data between one or more vehicles of the plurality of vehicles, wherein the generated data comprises at least one of: GNSS satellite exclusion occurrences determined based on a combination of GNSS data from the GNSS receiver and inertial data from the INS, and differences in navigation subsystem measurements.

2. The system of claim 1, wherein the at least one processor is further configured to restrict access to the generated data in response to an unauthorized request.

3. The system of claim 1, wherein to disseminate the generated data further comprises disseminating the generated data via a remote server.

4. The system of claim 1, wherein to generate data corresponding to the at least one GNSS disturbance further comprises generating a map based on the generated data.

5. The system of claim 1, wherein the one or more navigation parameters comprises at least one of position data and time data.

6. The system of claim 1, wherein the generated data comprises:
   GNSS signal strength fluctuations.

7. The system of claim 1, wherein to generate data corresponding to the at least one GNSS disturbance further comprises compiling the analyzed measurements.

8. The system of claim 1, further comprising a second processor coupled to the vehicle, wherein the second processor is configured to determine the integrity of the received measurements.

9. A non-transitory computer-readable medium having computer-executable instructions stored thereon which, when executed by one or more processors, cause the one or more processors to:
   receive navigation data measurements or navigation integrity data measurements from at least one navigation system, wherein the at least one navigation system comprises a Global Navigation Satellite System (GNSS) receiver and an Inertial Navigation System (INS) located on one of a plurality of vehicles;

analyze the received measurements;
identify one or more navigation parameters of at least one GNSS disturbance based on the analysis of the received measurements;
generate data based on the one or more navigation parameters;
store the generated data; and
disseminate the generated data between one or more vehicles of the plurality of vehicles, wherein the generated data comprises at least one of: GNSS satellite exclusion occurrences determined based on a combination of GNSS data from the GNSS receiver and inertial data from the INS, and differences in navigation subsystem measurements.

10. The non-transitory computer-readable medium of claim 9, wherein the computer-executable instructions further cause the one or more processors to restrict access to the generated data in response to an unauthorized request.

11. The non-transitory computer-readable medium of claim 9, wherein to disseminate the generated data further comprises disseminating the generated data via a remote server.

12. The non-transitory computer-readable medium of claim 9, wherein to generate data based on the at least one GNSS disturbance further comprises generating a map based on the generated data.

13. The non-transitory computer-readable medium of claim 9, wherein the generated data comprises at least one of position data and time data.

14. The non-transitory computer-readable medium of claim 9, wherein the generated data comprises:
GNSS signal strength fluctuations.

15. A method, comprising:
receiving a request for information about known GNSS disturbances;
accessing a database, wherein the database comprises generated data, the generated data generated by:
receiving navigation data measurements or navigation integrity data measurements from a navigation system, wherein the navigation system comprises a Global Navigation Satellite System (GNSS) receiver and an Inertial Navigation System (INS) located on one of a plurality of vehicles,
analyzing the received measurements,
identifying one or more navigation parameters of at least one GNSS disturbance based on the analysis of the received measurements, wherein the generated data is based on the one or more navigation parameters, wherein the generated data is stored in the database, and
providing the generated data in response to the request, wherein the generated data comprises at least one of: GNSS satellite exclusion occurrences determined based on a combination of GNSS data from the GNSS receiver and inertial data from the INS, and differences in navigation subsystem measurements.

16. The method of claim 15, wherein providing the generated data further comprises restricting access to the generated data only to an entity that requested the generated data.

17. The method of claim 15, wherein providing the generated data further comprises providing the generated data via a remote server.

18. The method of claim 15, wherein generating data based on the at least one GNSS disturbance comprises generating a map based on the generated data.

19. The method of claim 15, wherein the one or more navigation parameters comprises at least one of position data and time data.

20. The method of claim 15, wherein the generated data comprises:
GNSS signal strength fluctuations.

* * * * *